Sept. 4, 1923.

R. C. HUNTER

CORN POPPER

Filed April 20, 1922

1,466,721

WITNESS

*F. H. Williams*

Royall C. Hunter
INVENTOR.

BY *Parker & Carter*

ATTORNEY.

Patented Sept. 4, 1923.

1,466,721

UNITED STATES PATENT OFFICE.

ROYALL C. HUNTER, OF CHICAGO, ILLINOIS.

CORN POPPER.

Application filed April 20, 1922. Serial No. 555,765.

*To all whom it may concern:*

Be it known that I, ROYALL C. HUNTER, a citizen of the United States, residing at Chicago, in the county of Cook and State of Illinois, have invented a certain new and useful Improvement in Corn Poppers, of which the following is a specification.

My invention relates to a device for popping corn and particularly to a popper which shall be neat and compact and easy to operate and which shall entirely avoid the awkwardness and inconvenience of the usual form of manual corn popper in which an open frame has to be shaken over an open flame. A further object is to provide means whereby the popcorn, butter, and salt may be mixed together and seasoned during popping. Further objects will appear from time to time in the course of the specification.

I illustrate my invention more or less diagrammatically in the following drawings, wherein.

Like parts are indicated by like letters throughout the specification and drawings.

Figure 1:
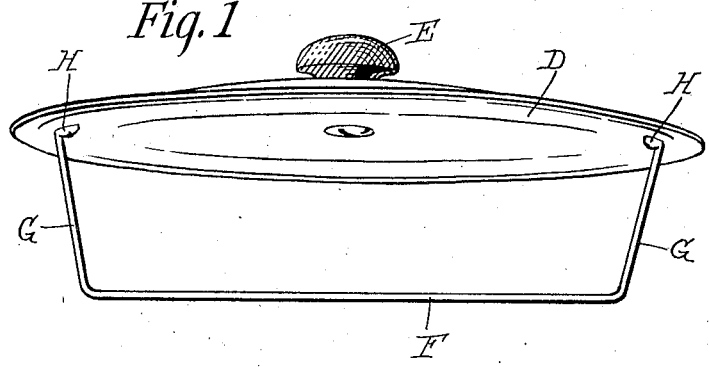
Figure 1 is a perspective view showing the lid of the popper and a stirring element.
Figure 2:
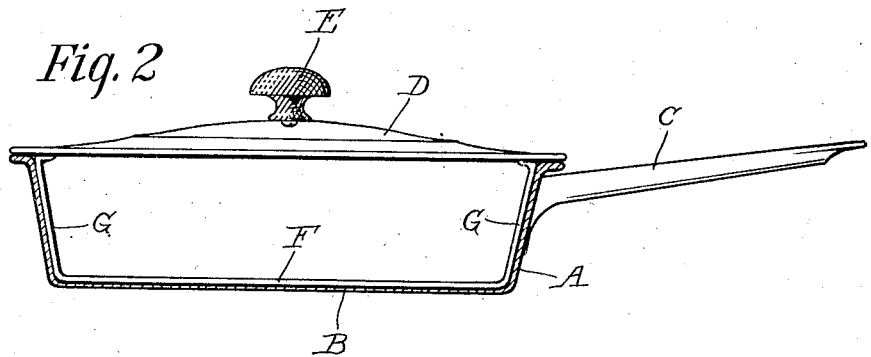
Figure 2 is a diagrammatic view showing the lid and stirring element in position in the pan.

A is the usual form of pan having a flat bottom B, a handle C. D is the ordinary form of pan lid having a large, centrally disposed handle E of wood or other heat insulating material. F is a transversal stirring element or wire which extends across the bottom of the pan, when the lid is in position as shown in Figure 2. It is connected to the top D of the pan by the upwardly inclined sections G—G which are soldered or otherwise suitably secured to the lid as at H—H. The members G are preferably, but not necessarily so inclined as to closely contact the inclined sides of the pan.

It will be understood that while I have illustrated a form of popper which is successfully operated and is now being manufactured and sold, nevertheless there might be many changes made in the number, shape, size and disposition of parts without departing from the spirit of my invention. Particularly the centrally disposed handle E may be made in a variety of shapes and a variety of materials, and I might under certain circumstances substitute for it a crank handle which may satisfactorily be used with a pan wherein the pan and lid are so shaped as to prevent easy displacement of the lid. The shape and location of the stirring element may of course be varied widely and a plurality of rods or other stirring elements might be used.

The use and operation of my invention are as follows:

I place the pan on any suitable heating means, and put in it butter or some substitute therefor, together with salt or other seasoning, and the popcorn grains. The lid or cover is then put in place and a slow twisting or turning of the wooden knob is sufficient to prevent burning during the corn-popping operation. The stirring element also thoroughly mixes the corn during the popping with the butter and seasoning and the wire, being bent to conform to the shape of the inside of the pan continuously strips the inside surface of such melted butter and salt as tends to gather at any one point. The size of the handle is such that the heat of the popping operation does not sufficiently heat it. It is also so proportioned as to enable it to be grasped comfortably with the thumb and finger and turns by a slight exertion of strength. The shape of the stirring wire effectively centers the lid on the pan.

While I have described and illustrated my invention for use as a corn popper it will be obvious that it may be used for the preparation of any substance or foodstuff which requires stirring or scraping of the pan during cooking or other treatment.

I claim:

A pop corn popper comprising a corn-containing vessel, a cover therefor adapted to rest upon and be supported by the rim of said vessel, an agitating element secured at either end to diametrically opposite points adjacent the circumference of said cover, the intermediate portion of said agitating element depending in the vessel closely adjacent the walls and bottom of said vessel, said agitating element being in substantially rigid relation to said cover, and means for rotating the cover and the agitating element comprising a handle substantially centrally located upon said cover, aligned between the points at which the ends of the agitator engage the edge of the cover.

Signed at Chicago, county of Cook and State of Illinois, this 17th day of April, 1922.

ROYALL C. HUNTER.